United States Patent [19]
Lin

[11] 3,855,125
[45] Dec. 17, 1974

[54] IMPROVED PROCESS FOR TREATING WATER AND WASTEWATER

[76] Inventor: Ping-Wha Lin, 506 S. Darling, Angola, Ind. 46702

[22] Filed: Nov. 9, 1972

[21] Appl. No.: 305,148

[52] U.S. Cl. .................................. 210/46, 210/47
[51] Int. Cl. ............................................. C02b 1/30
[58] Field of Search ............ 210/36, 42, 46, 49, 50, 210/47, 504, 506, 509; 106/118

[56] References Cited
UNITED STATES PATENTS

| | | | |
|---|---|---|---|
| 1,685,300 | 9/1928 | Travers | 210/42 |
| 3,511,777 | 5/1970 | Spinola | 210/49 |
| 1,732,409 | 10/1929 | Loomis et al. | 106/118 |
| 3,650,686 | 3/1972 | Hudson et al. | 210/42 |

Primary Examiner—Samih N. Zaharna
Assistant Examiner—Benoit Castel

[57] ABSTRACT

A solid pollution control product consists of a core material of lime, surrounded by a cracked shell of either calcium sulfate or calcium carbonate. The materials are referred to by coined terms as "Linfans" and "Linveins," respectively.

Both of these materials are particularly suitable for neutralizing acids in industrial wastes, removal of phosphates, and turbidity in wastewater by additions as a solid or in slurry form to wastewater.

In one embodiment of the invention, the "Linveins," I utilize the material as a water softening agent.

6 Claims, 8 Drawing Figures

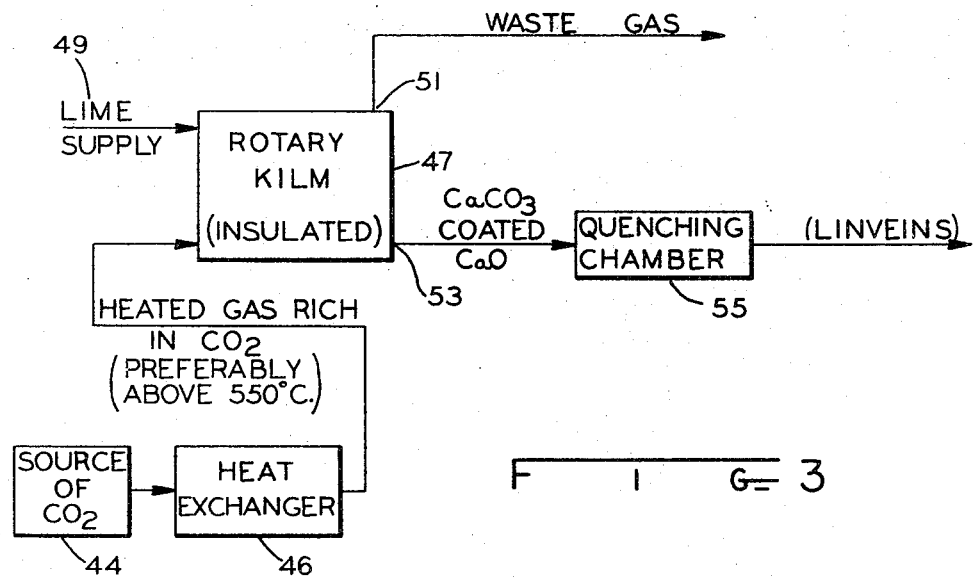
FIG. 3
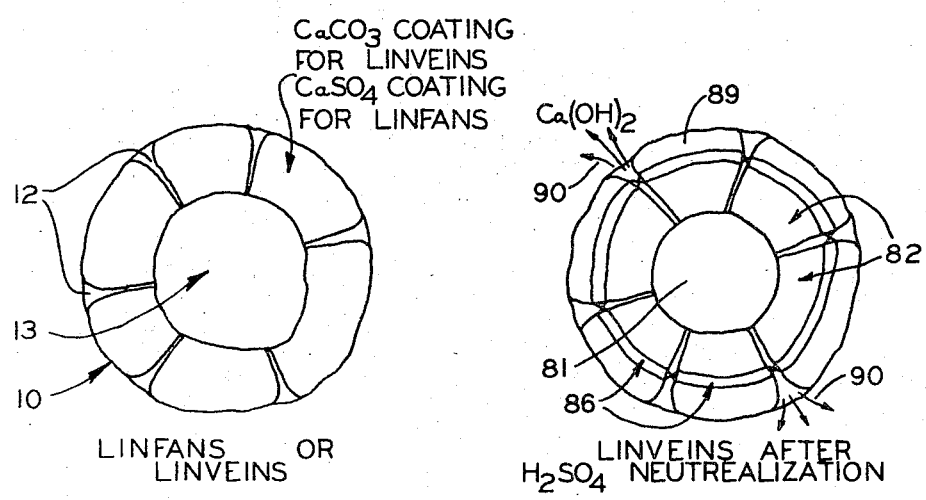
FIG. 4
FIG. 5

IMPROVED PROCESS FOR TREATING WATER AND WASTEWATER

BACKGROUND OF THE INVENTION

Modern industrial technology is imposing substantial demands upon available fresh water supplies making it impossible that wastewater from industrial operations be recycled and/or treated in a suitable manner to remove pollutants such as acids, phosphate salts, turbidity, etc. Irreversible damage can be done to the environment if pollution and squandering of natural resources, such as water, is continued unabated.

What is needed, is a convenient and economical method for treating industrial wastewater by economical, convenient practical means which will remove the acid content, phosphate salts and turbidity and to effect such improvement by utilization of a material which is readily obtained from other industrial processes. In my copending applications Ser. No. 235,343 entitled "AIR POLLUTION CONTROL," filed Mar. 16, 1972 and now U.S. Pat. No. 3,781,408 and Ser. No. 242,699 entitled "CONSTRUCTION MATERIALS," filed Apr. 10, 1972, I disclose a method for treating stack gasses so as to remove the sulfur trioxide content thereof and the product which is derived from this treatment of industrial gasses to effect removal of sulfur trioxide is the same or related material which is usable in the present invention for treating and purifying wastewater. Thus, the byproduct of my previously filed and copending applications is the same material which is usable in a still further method for upgrading the environment by treating and conserving our water supply as well as precluding pollution of atmosphere. The two systems, i.e., the one previously alluded to and the present system are thus complementary and each contributes to environmental improvement.

OBJECTS OF THE INVENTION

It is a principal object of the present invention to utilize the byproduct of a process for removing sulfur trioxide from flue gasses and to adapt such material to treatment of wastewater. Thus, pollution control in one process is used stepwise in connection with a second pollution control process.

It is another object of the present invention to provide a new material and process for treating wastewater, such material being derived from treatment of stack gasses to remove sulfur trioxide therefrom.

Another object of the invention is to employ a novel material consisting of a core of lime having a shell of cracked calcium sulfate or calcium carbonate such material being uniquely adapted to remove pollutants from wastewater such as free acid, phosphate salts, and turbidity in general.

A still further object of the present invention is to utilize improved products termed "Linfans" or "Linveins" in the treatment of wastewater and obtain the advantages of faster sedimentation of the reaction product, lower volume of sludge, greater compactness of sludge and improved facility to dewater the so-produced sludge.

It is an important object of the present invention to effect an efficient phosphate removal from sewage plant effluents as one of the wastewater items, and to reduce turbidity and bacterial counts. By removing the phosphate content, I suppress eutrophication in fresh water bodies.

An overall object of the present invention is to provide a novel material and process for effectively treating raw sewage which varies substantially from time to time in the percentage of pollutants concentrations and which is adaptable for whatever degree of pollution is present and intended for removal.

An important object of the present invention is to utilize the Linveins material for hardness removal.

Other objects and features of the present invention will become apparent from a consideration of the following description which proceeds with reference to the accompanying drawings.

DRAWINGS

FIG. 3 is a block diagram illustrating a still further embodiment process for producing Linveins;

FIG. 4 is an enlarged cross sectional view of a Linveins material or Linfans material;

FIG. 5 illustrates the Linveins material as in FIG. 4 but after it has been used for neutralization of $H_2SO_4$ wastewater and includes a primary calcium sulfate coating which is converted from calcium carbonate;

DETAILED DESCRIPTION OF THE INVENTION

The Linfans material which is obtained in the manner illustrated and described in my copending application "AIR POLLUTION CONTROL" consists of a core of unspent lime material having a cracked outershell of calcium sulfate. This is the material used in the present invention for treating industrial wastewater and domestic wastewater and effecting removal of acid, most typically sulfuric acid, phosphate salts and turbidity.

The byproducts of modern technology, and particularly the steel industries, produce pollution of fresh water by plant effluents. The problem has reached staggering proportions and threatens widespread contamination of fresh water supplies. If contaminants such as free acid are unneutralized and discharged as part of the effluent the effluent becomes dangerous to living organisms and in particularly, aquatic life. In order to safeguard the environment, municipalities as well as state and federal government agencies and prescribing that wastewaters which are discharged should not have a pH value outside the range of about 4.2 to about 8.4 indicating that the waste must have no appreciable acidity. Although lime is generally used as a means for neutralizing acids, lime is not satisfactory in neutralizing sulfuric acid because the resulting calcium sulfate is highly insoluble and precipitates as a salt which presents sludge removal problems. It is an important feature of the present invention that the Linfans material, containing as it does a core of unspent lime, is ideal for neutralization of sulfuric acid and its performance is far superior to high calcium lime.

The reaction between Linfans and sulfuric acid may be represented as follows:

$$CaO + H_2O \rightarrow Ca(OH)_2 \; H \; 19 \; K\text{-cal/mole}$$

The lime which is located in the core area 13 of the Linfans is reactable with the contaminated water which seeps through the cracks in the calcium sulfate shell for access to the lime (FIG. 4). The hydrated lime in the core area reacts with sulfuric acid in accordance with the following reaction:

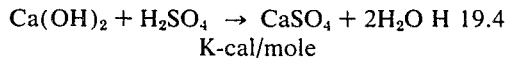

$$Ca(OH)_2 + H_2SO_4 \rightarrow CaSO_4 + 2H_2O \; H \; 19.4 \; K\text{-cal/mole}$$

Once the reaction occurs, the heat of reaction will cause expansion of the Linfans particle 10 thus increasing the proportions of the cracks 12 in the calcium sulfate coating (FIG. 4) promoting even further diffusion of the fluids in and out of the Linfans.

Figure 8:
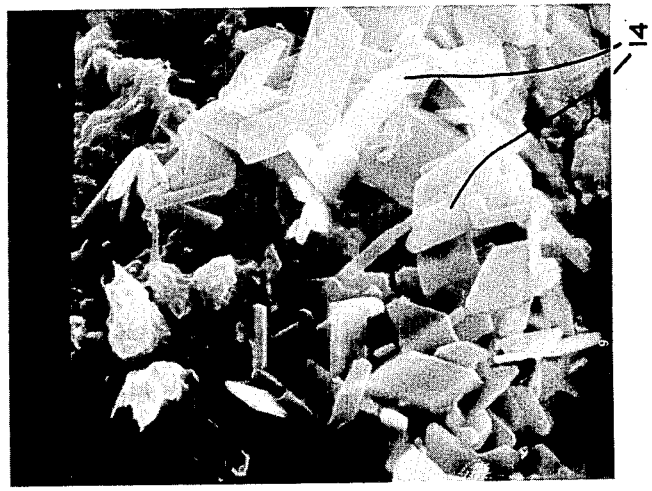
Figure 7:
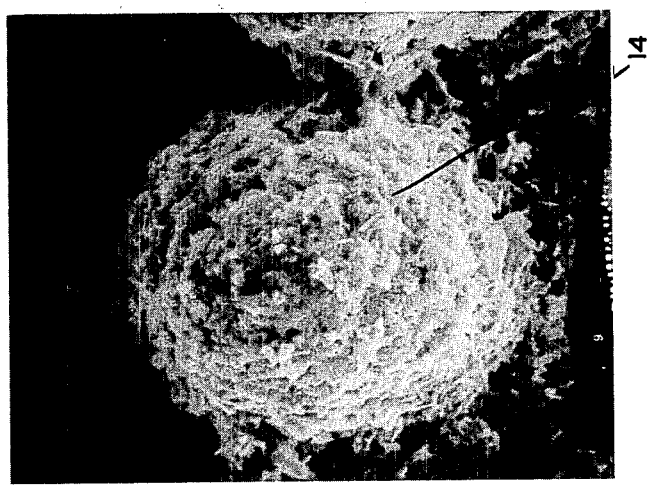
FIG. 7 is the same particle illustrated in FIG. 6 but at 750 magnification; and, FIG. 8 is the same material as FIGS. 6 and 7 but at 5,000 magnification.
Figure 6:
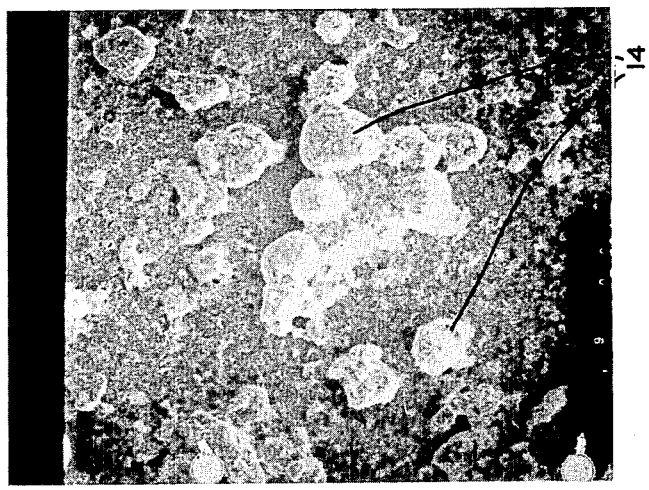
FIG. 6 illustrates the Linfans material after it has been used to neutralize acid in wastewater, such material being magnified 100 times.

It is known that the calcium hydroxide within the Linfans diffuses through the crack 12 to react with sulfuric acid to form very tiny calcium sulfate crystals on the surface 14 of the Linfans as indicated by the photomicrographs shown in FIGS. 6, 7 and 8 on the outer surface 14 of the Linfans. The Linfans move through the sulfuric acid contaminated wastewater and its outer shell of insoluble calcium sulfate will furnish as nuclei causing minute calcium sulfate crystals to adhere to the coating. When the mixture is slightly agitated the collision of these growing calcium sulfate nuclei is promoted so that the nuclei will combine into larger particles and effect a higher settling velocity of calcium sulfate particles. Consequently, there is less retention of wastewater within the sedimentation tank.

Sludges which are obtained from neutralization of sulfuric acid by high calcium lime when compared with sludges developed from Linfans will clearly illustrate the superiority of the material of the present invention. Sludges derived from neutralizing sulfuric acid with high calcium lime have poor compaction characteristics attributable to the typical acicular shape of the calcium sulfate crystals; in contrast with this, almost all of the calcium sulfate crystallization utilizing the material of the present invention effects a more compact sludge. Sludge volume is important in that it represents the quantity of material to be handled in wastewater treatment. Because the size of calcium sulfate particles in the sludge are larger when neutralization is effected with Linfans the sludge is correspondingly more easily dewatered and thus sludge disposal problems are minimized.

The present of sludge volume in sulfuric acid solution while dependent on the percent of unspent lime in Linfans should be neither extremely low nor extremely high, the operative range being from about 95 percent to about 55 percent by weight and the preferred subrange is between about 85 to about 65 percent by weight.

When utilizing the Linfans of the present invention for effecting acid neutralization those advantages which are particularly noteworthy over conventional lime usage are: improved sedimentation of the reaction product; a smaller volume of calcium sulfate sludge production; a greater compactness of sludge; and, improved dewatering of the resultant sludge.

The Linfans are easily combined with the acids in wastewater being merely fed directly into the wastewater in dry form or in the form of slurry and in the event that a slurry is used the slurry should be prepared shortly before application.

The invention has further significance in that the Linfans are extremely valuable in effecting phosphate and turbidity removal. It has now become abundantly clear that excessive phosphate salts and wastewater are highly damaging to the environment causing eutrophication and the like.

Phosphate and turbidity removal are most generally carried out from sewage plant effluents by chemical means, preferably by chemical coagulation. Chemical treatment reduces not only the phosphates but also the turbidity and bacterial counts by coagulation with calcium oxide. Linfans in a rather complex procedure, through reaction with raw sewage, causes the unspent lime in the Linfans to directly react with orthophosphate to form hydroxylapatite phosphate and with $Ca(HCO_3)_2$ to form calcium carbonate respectively. Both reactions take place inside the Linfans and in the immediate vicinity of the Linfans. The reaction product together with insoluble anhydrous calcium sulfate coating of Linfans serves as an adsorbing agent whereby the polyphosphates and other undesirable elements in wastewater are removed. Comparing orthophosphate and turbidity removal from raw sewage by high calcium lime and Linfans, it has been found that Linfans has both higher turbidity removal efficiency at various dosage levels ranging from 200 parts per million to 800 parts per million as compared with high calcium lime, and with respected phosphate removal the Linfans achieve more efficient removal than high calcium lime, at the same low dosage level which is below 500 parts per million.

WORKING EXAMPLE 1

ACID NEUTRALIZATION

Utilizing several types of Linfans produced from different $SO_x$ removal procedures were compared with a high calcium lime in the neutralization tests. The tests were conducted on 1 percent by volume (equivalent to 1.85 percent by weight) sulfuric acid solutions. The Linfans and lime powders were added gradually to 500 ml. of an agitated, 1 percent sulfuric acid until the desired pH value was reached. The neutralized solutions were then transferred to 1-liter graduated cylinders for sedimentation. Since the neutralizing point for sulfuric acid is at pH 4.2, it was decided that in the neutralization tests, the pH value of the acid solution should be adjusted to 4.2 or slightly above 4.2. At a pH of 4.2, an addition of a small amount of alkaline reagent will appreciably raise the pH value of the solution.

Evaluation of the Results:

The results of the experiment such as dosage, percent $CaSO_4$ in Linfans, and percent sludge volume are found in Table 1.

TABLE I

A COMPARISON OF SLUDGE VOLUMES RESULTING FROM THE NEUTRALIZATION OF A 1% BY VOLUME SULFURIC ACID SOLUTION BY HIGH CALCIUM QUICKLIME AND LINFANS RESPECTIVELY

| Type Powder | Powder Dosage g/l | pH after neutralization | $CaSO_4$ in Linfans % by wt. | % Sludge vol. % one hour* |
|---|---|---|---|---|
| Linfans No. 1B | 18.28 | 4.5 | 29.4 | 15 |
| Linfans No. 1A | 14.28 | 4.5 | 13.0 | 16 |
| Linfans No. 1 | 13.40 | 4.4 | 3.9 | 30 |
| Linfans No. 2 | 15.40 | 4.2 | 16.4 | 18 |
| Linfans No. 3 | 14.44 | 4.6 | 10.9 | 16 |
| Linfans No. 4 | 46.60 | 4.5 | 72.0 | 32 |
| Linfans No. 5 | 58.20 | 6.2 | 78.0 | 38 |
| High Calcium Lime | 12.88 | 6.0 | — | 42 |

Acid volume = 500 ml.
Acid temperature = 27°C.
*Expressed as percent of original volume after one hour of sedimentation From Table 1, it can be seen that, in all of the cases, Linfans produced a smaller sludge volume from neutralization than high calcium lime. In addition, Linfans No. 1 B produced the least sludge volume, only 15 percent of the volume of the acid solution. The percentage of sludge volume produced from the neutralization by Linfans is dependent on the percent of $CaSO_4$ in Linfans, neither an extremely low (3.9%) nor an extremely high (78 percent) is desirable.

The sludges from neutralization of acid solutions by high calcium lime have poor compaction characteristics which have been attributed to the typical acicular shape of the calcium crystal.

By contrast, the $CaSO_4$ crystals from neutralization by unspent lime in Linfans are in rhombic form. This explains why more compact sludges were produced by Linfans in the tests. FIG. 6 is a photomicrograph of 100 x magnification of general view $CaSO_4$ sludge particles from neutralization of the acid solution by Linfans.

FIG. 7 is a photomicrograph of 750 x magnification of a large $CaSO_4$ sludge particle that resulted from neutralization of the acid solution by Linfans No. 1 B, and FIG. 8 is a photomicrograph of 5,000 x magnification showing surface structure of the particle in FIG. 7. From these two figures, it can be seen that the sludge particles produced from neutralization by Linfans are composed of the rhombic crystals.

It is believed that the formation of the large $CaSO_4$ sludge particles is due to the growth of $CaSO_4$ crystals; the insoluble anhydrous $CaSO_4$ in Linfans serve as nuclei in particle formation.

WORKING EXAMPLE 2

PHOSPHATE AND TURBIDITY REMOVAL

In recent years, great emphasis has been placed on the removal of phosphates from sewage treatment plant effluents. Chemical coagulation followed by precipitation of the critical nutrient, phosphorus, seems to be the most popular treatment. Chemical treatment results not only in reduction of phosphates, but also in turbidity, B.O.D., and bacterial counts.

Comparsion of Linfans and Lime in the Removal of Phosphate from an Artificial Phosphate Solution:

Linfans has been considered for phosphate and turbidity removal. In order to ascertain its efficacy, a series of jar tests, designed to compare orthophosphate removal efficiency by high calcium lime and Linfans No. 1B respectively, was conducted on 1,000 ml. $KH_2PO_4$ phosphate solution containing 25 mg/l. $PO_4$. The results are listed in Table 2.

TABLE II

COMPARISON OF ORTHOPHOSPHATE REMOVAL FROM $KH_2PO_4$ SOLUTION* BY HIGH CALCIUM LIME AND LINFANS 1B RESPECTIVELY (1000 ml. SAMPLE USED)

| | Treatment with High Calcium Lime | | Treatment with Linfans 1B | |
|---|---|---|---|---|
| Sample | Lime Dosage p.p.m. | Orthophosphate as $PO_4$ p.p.m. | Linfans Dosage p.p.m. | Orthophosphate as $PO_4$ p.p.m. |
| 1 | 0 | 25.0 | 0 | 25.0 |
| 2 | 50 | 7.8 | 50 | 22.8 |
| 3 | 100 | 7.6 | 100 | 20.5 |
| 4 | 150 | 6.6 | 150 | 10.5 |
| 5 | 200 | 4.5 | 200 | 6.8 |
| 6 | 250 | 4.2 | 250 | 4.0 |

* contains 25 p.p.m. as $PO_4$
** tests performed on supernatnat fluid after one hour sedimentation From these results, it can be seen that Linfans No. 1 B at low dosages is not as efficient in $PO_4$ removal from the phosphate solutions as the high calcium lime. However, when the dosage is above 150 p.p.m. it is just as good as high calcium lime.

TABLE III

VOLUME OF SETTLED SLUDGE[1] RESULTING FROM PHOSPHATE REMOVAL BY HIGH CALCIUM LIME AND LINFANS 1B RESPECTIVELY

| Type of Chemical Used | Dosage mg/l. | Volume of Settled Sludge (ml.) | | | | | |
|---|---|---|---|---|---|---|---|
| | | 5 min. | 10 min. | 15 min. | 30 min. | 60 min. | 24 hours |
| Linfans | 150 | 0.5 | 1.4 | 3.0 | 5.0 | 5.5 | 5.5 |
| | 200 | 1.2 | 3.5 | 7.0 | 8.5 | 8.5 | 7.5 |
| | 250 | 2.0 | 6.0 | 11.0 | 12.0 | 12.0 | 8.0 |
| High Calcium Lime | 150 | — | — | — | 8.0 | 11.0 | 4.0 |
| | 200 | — | 0.03 | 2.0 | 10.0 | 11.0 | 4.0 |
| | 250 | — | 0.05 | 10.0 | 15.0 | 15.0 | 8.0 |

[1]From 1000 ml. $KH_2PO_4$ solution containing 25 ml./l. as $PO_4$

Table III shows the settling rates of sludges in the phosphate solutions after treatment with Linfans No. 1 B and high calcium lime at different dosage levels respectively. The tests were performed in Imhoff cones, and the treated solutions were transferred to Imhoff cones from jar tests after rapid mixing at 100 rpm for 1 minute, and slow flocculation at 60 rpm for 10 minutes. The results in Table 3 shows that sludge volumes from phosphate solutions treated with Linfans No. 1 B are less than from high calcium lime at 60 minutes sedimentation. The reductions in sludge volume after 1 hour sedimentation were due to compaction. A comparsion of the results shows that the sludges from the phosphate solution treated with high calcium lime took a longer time to settle, and the reduction in sludge volume due to compaction were less for treatment with Linfans.

Removal of Phosphate and Turbidity from Raw Sewage

Removal of phosphate and turbidity from raw sewage by treatment with high calcium lime and Linfans No. 1

B respectively has also been investigated in the laboratory. The results are shown in Table 4.

TABLE IV

COMPARISON OF ORTHOPHOSPHATE AND TURBIDITY REMOVAL FROM RAW SEWAGE[1] BY HIGH CALCIUM LIME AND LINFANS 1B RESPECTIVELY

| | Treatment with High Calcium Lime[2] | | | Treatment with "Linfans" No. 1B[2] | | |
|---|---|---|---|---|---|---|
| Sample | Lime Dosage | Ortho-phosphate as $PO_4$ p.p.m. | Turbidity p.p.m. | Linfans Dosage p.p.m. | Ortho-phosphates as $PO_4$ p.p.m. | Turbidity p.p.m. |
| 1 | 0 | 15 | 140 | 0 | 15 | 138 |
| 2 | 200 | 14.2 | 130 | 200 | — | 87 |
| 3 | 250 | 13.5 | — | 250 | — | — |
| 4 | 300 | 13.0 | 115 | 300 | 9.1 | 67 |
| 5 | 350 | 12.0 | — | 350 | — | — |
| 6 | 400 | 10.5 | 100 | 400 | 6.3 | 42 |
| 7 | 500 | 5.0 | 80 | 500 | 6.0 | 38 |
| 8 | 600 | 3.3 | 55 | 600 | 5.0 | 35 |
| 9 | 700 | 1.0 | 25 | 700 | 4.2 | 33 |
| 10 | 800 | 1.2 | 25 | 800 | 1.8 | 21 |

[1]Sample taken from Angola Sewage Treatment Plant
[2]1000 ml. sample used and tests performed on supernatant fluid after 1 hour sedimentation.

From the experimental results, it is evident that at the low level dosage (less than 500 ppm) Linfans is a better material than high calcium lime in $PO_4$ removal. With regard to turbidity removal, Linfans No. 1 B has achieved a higher removal efficiency at all dosage levels.

In a complex solution such as raw sewage, it is believed that the unspent lime in Linfans reacts directly with orthophosphate and hardness to form hydroxylapatite and calcium carbonate. The chemical products together with insoluble $CaSO_4$ in Linfans serves as an important adsorption agent whereby turbidity, polyphosphate and other undesirable elements are removed.

FURTHER EMBODIMENT LINVEINS

Figure 1:
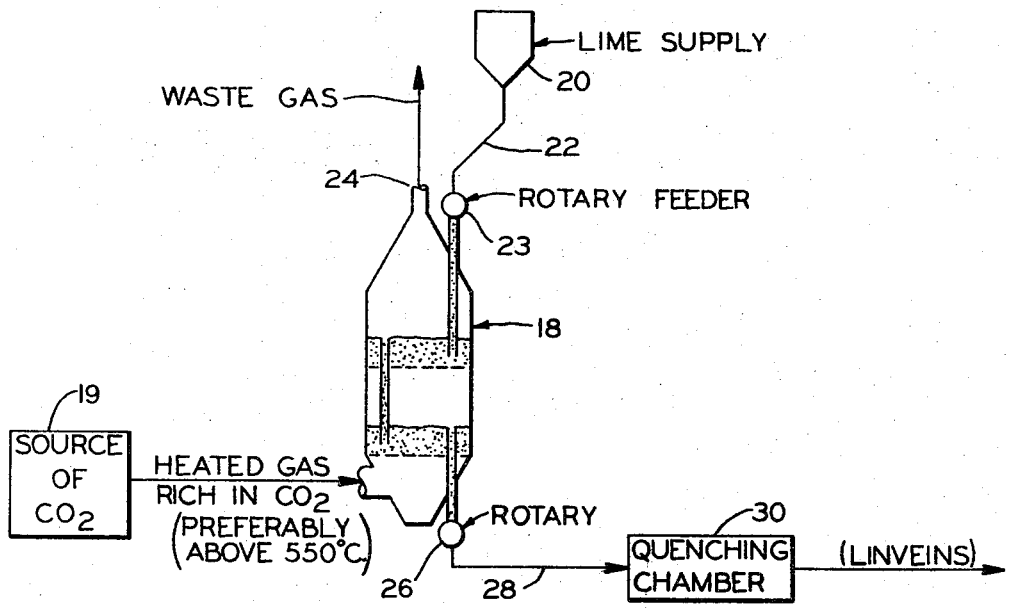
FIG. 1 is a schematic view illustrating the process for producing the Linveins or cracked $CaCO_3$ coated lime.
Figure 2:
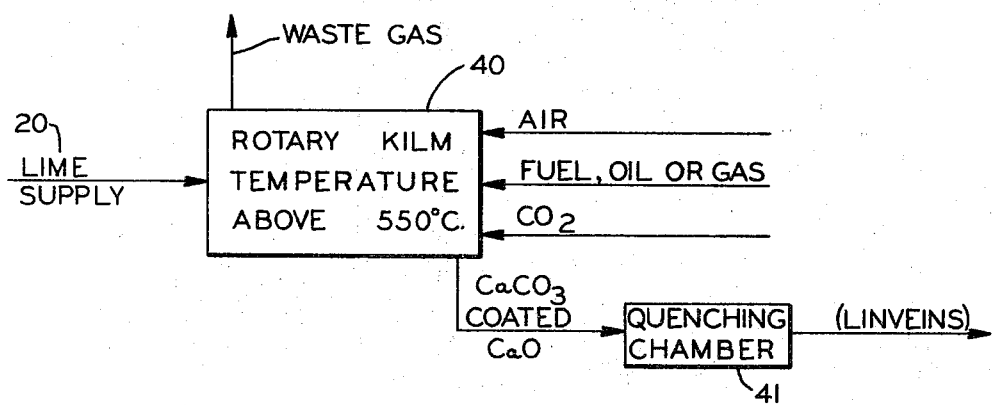
FIG. 2 is a block diagram illustrating how, a lime supply is converted into a quantity of Linveins material consisting of a cracked coating of calcium carbonate enclosing lime particles and for use in the present invention.

In place of the Linfans which consists of a core of lime surrounded by a shell of cracked calcium sulfate, in a second embodiment of invention (FIG. 4) the core 13 of lime particles are coated with a coating 12 of calcium carbonate including crack 15 the product being termed Linveins. This material is produced by exposing high calcium lime particles to gasses containing a high concentration of moistened carbon dioxide within an enclosed vessel 18 (FIG. 1). The vessel is maintained with an elevated interior temperature, preferably above 550°C. and the concentration of calcium dioxide derived from source 19 is passed into the interior of the vessel 18 which is heated. A constant lime supply 20 is provided through line 22, having a rotary feeder 23, the waste gas being vented as indicated at 24. The product is removed through rotary valve 26 through line 28 and into a quenching chamber 30.

The carbon dioxide concentration of the gasses in the vessel should be maintained at above 5 percent for a temperature between 600°C. and 700°C; above 10 percent for a temperature range of 700°C. to 750°C.; above 25 percent for a temperature range of 750°C. to 800°C.; above 50 percent for a temperature range between 800°C. and 840°C.; and, above 60 percent for a temperature range between 840°C. and 860°C. The exposure time is between 2.0 and 40 minutes and after carbonation the hot lime particles with calcium carbonate coatings, are discharged immediately from the reaction temperature to a quenching chamber temperature sufficiently to induce thermal fracture on the coating. A sudden cooling or thermal shock causes the calcium carbonate coatings to crack, (FIG. 4). The thickness of calcium carbonate is in the range of 4.5. to 19 microns.

The reason why the coating is of this magnitude is owing to the diffusion coefficient through the layer of calcium carbonate to reach and react with the core. The ground high calcium commercial lime is typical about 100 percent passing number 8 sieve, and 2 to 4 percent passing a number 100 sieve can be used. The carbonation is achievable either in a multistage counter current reactor with lime applied at the top of the vessel and the $CO_2$ introduced at the bottom (as indicated in FIG. 1) or the carbonation can occur within a rotary kiln 40 having a pitch angle of inclination from the horizontal of about 1 inch per foot of length. The speed of rotation of the kiln is about 120 revolutions or more per minute. The product outflow is quenched in a quenching chamber 41, the same as in FIG. 1.

Carbonation can also occur in the manner indicated in FIG. 3 in which the gas used for carbonation is obtained from any suitable source of carbon dioxide 44, carbon dioxide passing first through a heat exchanger 46, before going into the rotary kiln 47 to which is added lime from a lime supply 49. Venting of waste gas through 51 and an outlet for the calcium carbonate coated calcium oxide 53, leads to a quenching chamber 55 wherein is produced the Linfans as in the previous manner.

Linveins are used among other purposes for a neutralization of acid in wastewater, removal of phosphate turbidity in wastewater and also used for water softening.

Linveins as a neutralizing agent, are very effective in neutralizing sulfuric acid in wastewater and when the Linveins are added to sulfuric acid solution, sulfuric acid reacts with a calcium carbonate coating to form thick impervious primary calcium sulfate overlaying the calcium carbonate core.

Because the solubility of calcium carbonate is very low (only 17 parts per million at room temperature)

Linveins tend to remain in particulate form within the wastewater and simultaneously the inner core of calcium oxide reacts with the water and $Ca(OH)_2$ seeps out through the cracks of calcium carbonate coatings on the Linveins to react with sulfuric acid in the wastewater and the reaction is instantaneous. The reaction product consists of tiny calcium sulfate crystals which adhere to the primary calcium sulfate coatings which serve as nuclei. Referring to FIG. 4, the core of calcium oxide 13 has a cracked coating of calcium carbonate, there being a plurality of cracks. Referring to FIG. 5, the core after reaction with sulfuric acid water now has a core 81 of calcium hydroxide and a small amount of calcium sulfate, a coating of calcium carbonate 82 and a calcium sulfate primary coating 86. Seepage flow from the core outwardly through the cracks is indicated by the arrows 90 and labled "calcium hydroxide."

A secondary coating 89 is formed as the reaction product of the outflowing calcium hydroxide and the sulfuric acid content in the wastewater.

The particles in the sludge formed by neutralization of sulfuric acid by the Linveins are generally regular but unsmooth and the sludge volume formed is substantially less than sludge formed by neutralization with high calcium lime.

LINVEINS FOR PHOSPHATE AND TURBIDITY REMOVAL FROM WASTEWATER

Linveins also react with phosphates and effect turbidity removal from wastewater.

The core consisting of lime reacts with the orthophosphate to form hydroxylapatite. The calcium carbonate coating together with calcium carbonate produced by the reaction between hardness and lime in Linveins, serves as an adsorption agent effecting removal of the polyphosphate and turbidity from the wastewater.

LINVEINS AS A WATER SOFTENING AGENT

Lime-soda process has been the commercial method used for removal of hardness. In its application, the raw water is first treated with lime, which reacts with the bicarbonates to form insoluble carbonates that precipitates; and then with soda, which acts on non-carbonate hardness and precipitates the calcium as carbonate, leaving in the water an equivalent of sodium sulfate, chloride, or nitrate. The lime also converts the magnesium salts to the hydroxide which precipitates. Most of the precipitated calcium and magnesium salts are then removed by settling. In ordinary lime-soda process, commercial lime is used as reactant, the $CaCO_3$ formed tends to form supersaturated solution that does not approach saturation rapidly even in the presence of precipitated material. In practice it is impractical to allow detention time that will permit complete precipitation; consequently water softened by the lime usually have from 50 to 80 ppm of residual hardness. In order to control the precipitates, a water softening plant requires complex treatment facilities, such as flocculation tank, sedimentation tank, recarbonation tank, filters, and sludge removal units, (not shown).

Linveins, the lime particle coated with cracked $CaCO_3$ coatings can be advantageously used to replace commercial lime in lime-soda process; it does not have the disadvantages inherent to commercial lime in water softening.

Method of Feeding

Linveins is fed to hard water by dry feeding method. It is added to a rapid mixing tank with hard water. Rapid mixing disperses the Linveins uniformly in water and the detention time in the mixing tank is about 1 minute.

Reaction Between the Linveins and Hardness

The lime in the core area of the new product will react with water which seep through the cracks in the coating according to the following reaction:

$$CaO + H_2O \rightleftharpoons Ca(OH)_2 \quad H\ 19\ \text{K-cal/mole}$$

The hydrated lime reacts with carbonate hardness according to the following formula:

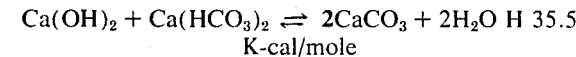
$$Ca(OH)_2 + Ca(HCO_3)_2 \rightleftharpoons 2CaCO_3 + 2H_2O \quad H\ 35.5\ \text{K-cal/mole}$$

The heat of the reactions cause the particles to expand, and the reaction between lime and hardness causes core area to grow. In some instances, the particles disintegrated, and the $CaCO_3$ coating burst into small pieces, and these small $CaCO_3$ coatings will serve as nuclei in the water softening process. In other case, the $CaCO_3$ coatings firmly bounded with the lime core. The reaction between calcium bicarbonate and lime is almost instantaneous, and it takes place either inside or outside the coatings. The $CaCO_3$ formed from the reaction will be held inside the $CaCO_3$ coatings or adhere on the surfaces of the coatings.

Since the $CaCO_3$ coatings are uniformly distributed in the water, and they are very near the points where the reaction takes place, the reaction product $CaCO_3$ will form inside the coating or grow on the surface of $CaCO_3$ coatings, causing particle size to grow, thereby sedimentation rate will be greatly increased. The detention time in flocculation can be greatly reduced, and in many cases, the floccuation and sedimentation can be combined into one single unit.

The size spectrum of Linveins is wide. The small Linveins particles with sizes smaller than 10 microns, consists only $CaCO_3$, and these particles are so small that they will remain in water for longer time. However, during water softening process, they serve as nuclei to adsorb $CaCO_3$. In a slightly agitated fluid, collision of the growing nuclei is promoted, so that the nuclei will combine into a large mass particle which can be easily settled out.

Results of Water Softening Process by Linveins:

When waters are treated or softened by Linveins, hardness can be reduced to less than 50 ppm as $CaCO_3$. At room temperatures, without the aid of coagulants. even 38 ppm of residual hardness can be achieved in less than one hour, if the waters contain only temporary calcium hardness.

On account of rapid growth in size of the Linveins particles, the $CaCO_3$ resulting from water softening can be easily settled out in a sedimentation tank. The lime-soda process employing Linveins as reactant will require smaller sedimentation tank than ordinary softening plants. Also, less or no coagulant is required for the water softening plant using Linveins. Because of the reduction of the sizes of sedimentation tank and of the amount of coagulant used, the capital expenditure and operating cost for the plants using Linveins under average condition, will be considerably less than these using ordinary commercial lime.

In the lime-soda process which utilizes the Linveins the resulting sludge is dense and there is very little supersaturation of calcium carbonate in the waters so that precipitation and deposition of calcium on filter beds or pipe lines is eliminated or reduced. Therefore, carbonation of finished water can be eliminated or reduced. Since water softening each year is becoming more widespread, the present invention can be expected to have a substantial demand. Future industrial production is likely to continue to require waters of increasingly high purity and these will probably be derived from lower quality water supplies. Population density and urbanization will continue to increase throughout the world and therefore water softening is an important water supply consideration in the future.

Working Example 3

LINVEINS FOR WATER SOFTENING

Pure lime and Linveins produced from different $CO_2$ reaction procedures were added to their respective 1,000 ml. artificial hard waters containing 220 p.p.m. carbonate hardness as $CaCO_3$. Settling tests by Imhoff cones, hardness determinations by titrations were performed at different times and the results are shown in Table V. From these results, it is apparent that the sludges from the hard waters treated by Linveins have higher settling rates, and sedimentations were almost completed in ten minutes. Linveins No. 3 showed the best results with regard to hardness removal. At a dosage of 225 p.p.m., the hardness of the water was reduced to an impressive level of 38 p.p.m. in one hour, and 30 p.p.m. in four hours. Since the solubility of $CaCO_3$ at room temperature is 17 p.p.m., it is apparent, that there was very low, if any, supersaturation of $CaCO_3$ in the treated water.

Linveins No. 2A was prepared by exposing pure lime to moistened $CO_2$ at 550°C. for 15 minutes. Linveins No. 3 was prepared by exposing pure lime to moistened $CO_2$ at 550°C. for 30 minutes. ,250

The advantages of Linveins in water softening will include a fast reaction and sedimentation rate and lower volume of sludge.

SUMMARY

Chemicals other than CaO may be used to combine at least one of $SO_2$, $SO_3$ and $CO_2$ gasses to form stable, non-gaseous chemical reaction product shell. For example, magnesia, MgO, closely resembles CaO, is almost invariably present in commercial lime. It reacts with $SO_2$, $SO_3$ to form $MgSO_4$, and with $CO_2$ to form $MgCO_3$. MgO, like pure lime, is a good chemical for acid neutralization, and turbidity and phosphate removal.

In addition, Linfans or Linveins can also be used to effectively remove copper, nickel, chromium, zinc, aluminum, proteins, sulfides, iron, color, and non-specified dispersements in water or wastewater. They can be used to treat wastes from chemical, textile, wood pulping, metal finishing, coking, petroleum, synthetic rubber and other industries.

Although the present invention has been illustrated and described in connection with a single example embodiment, it will be understood that this is illustrative and not restrictive of the invention. It is reasonably to be expected that those skilled in this art can make numerous revisions and adaptations and it is intended that such revisions and adaptations will be included within the scope of the following claims as equivalents of the invention.

What I claim is:

1. A process for neutralizing acids in industrial wastes and to remove contaminants such as phosphates, acids and turbidity in wastewater, comprising the steps of mixing with the wastewater a material consisting of a core of lime having a shell of distinctly cracked calcium salt derived by heating such material to a temperature above 600°C for a period of two to forty minutes and suddenly quenching such material by cooling to room temperature to induce thermal fracture so that said distinctly cracked calcium shell is characterized as having access channels to said core and said shell being selected from the group consisting of calcium sulphate and calcium carbonate, and collecting and separating sludge formed as a byproduct of reaction between the lime core and the said contaminants to effect substantially contamination free water.

2. The process in accordance with claim 1 including the step of mixing and then slightly agitating the said material and water during the decontamination step to produce minute calcium sulfate crystal formation formed as an inherent coating on the outer surface of said material.

3. The process in accordance with claim 1 wherein the said core material consists of lime having a cracked coating of calcium carbonate and such material is combined with water to remove the carbonate hardness thereof.

4. The process for purifying water comprising the steps of: mixing with the water a product consisting of a core of lime having a distinctly cracked outer shell derived by heating such product to a temperature of about 600°C for a period of 2 to 40 minutes and then rapidly quenching such mixture by cooling to room temperature to induce thermal fracturing in the shell of said product, said shell being comprised of a material selected from the group consisting of calcium sulphate and calcium carbonate, such cracked outer shell providing access passages to said core of lime, dispersing such material throughout the entirety of the water, and collecting the reaction product of the contamination and lime core on the surface of said product.

5. The process in accordance with claim 4 which the outer shell consists of calcium carbonate and the contamination removed is a carbonate hardness material.

6. The process for neutralizing acids in industrial wastes, and removing phosphates and turbidity in wastewater, comprising the steps of: mixing with the wastewater a compound consisting of a core of lime having a shell of cracked calcium sulphate derived from heating such compound to a temperature above 600°C for a period of 2 to 40 minutes and then suddenly quenching such compound by cooling to room temperature to induce thermal fracture in the shell of such compound, such cracks providing access openings whereby the acid or phosphate content of the wastewater can be accessed to the interior core of lime, and collecting and separating the sludge formed as a byproduct between the limee core and the acid, phosphate and turbidity of the wastewater to effect a substantially contamination free water.

* * * * *

PO-1050
(5/69)

UNITED STATES PATENT OFFICE
CERTIFICATE OF CORRECTION

Patent No. 3,855,125            Dated December 17, 1974

Inventor(s) Ping-Wha Lin

It is certified that error appears in the above-identified patent and that said Letters Patent are hereby corrected as shown below:

Column 3, line 54, delete "present" and insert -- percent --.

Table V of page 22b of the specification was omitted. Attached hereto and made a part of this Certificate of Correction is a copy of page 22b as it appears in the original application.

Signed and sealed this 22nd day of April 1975.

(SEAL)
Attest:

RUTH C. MASON
Attesting Officer

C. MARSHALL DANN
Commissioner of Patents
and Trademarks